United States Patent
Ni et al.

(10) Patent No.: US 11,657,147 B1
(45) Date of Patent: May 23, 2023

(54) SYSTEM AND METHOD FOR DETECTING ADVERSARIAL ACTIVITIES USING A COMPACT GRAPH REPRESENTATION

(71) Applicant: HRL Laboratories, LLC, Malibu, CA (US)

(72) Inventors: Kang-Yu Ni, Calabasas, CA (US); Charles E. Martin, Thousand Oaks, CA (US); Kevin R. Martin, Oak Park, CA (US); Brian L. Burns, West Hollywood, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 1179 days.

(21) Appl. No.: 15/961,706

(22) Filed: Apr. 24, 2018

Related U.S. Application Data

(60) Provisional application No. 62/500,489, filed on May 2, 2017.

(51) Int. Cl.
  *G06F 21/55* (2013.01)
  *G06F 21/56* (2013.01)
  *G06F 16/901* (2019.01)

(52) U.S. Cl.
  CPC ........ *G06F 21/554* (2013.01); *G06F 16/9024* (2019.01); *G06F 21/561* (2013.01); *G06F 21/566* (2013.01)

(58) Field of Classification Search
  CPC .. G06F 21/554; G06F 16/9024; G06F 21/561; G06F 21/566
  See application file for complete search history.

(56) References Cited

PUBLICATIONS

Anna Sapienza, Detecting Anomalies in Time-varying Networks using Tensor Decomposition, 2015 IEEE 15th International Conference on Data Mining Workshops, 2015.*

Jimeng Sun, Beyond Streams and Graphs: Dynamic Tensor Analysis, 2006.*

L. Lamport, "Time, clocks and the ordering of events in a distributed system," Commun. ACM, vol. 21, No. 7, pp. 558-565, Jul. 1978.

Marrington, Andrew Daniel. "Computer profiling for forensic purposes." pp. 1-227, (2009).

Fidge, Colin J. "Timestamps in message-passing systems that preserve the partial ordering." Proceedings of the 11th Australian Computer Science Conference. vol. 10. No. 1. 1988, pp. 56-66.

Mattern, Friedemann. "Virtual time and global states of distributed systems." Parallel and Distributed Algorithms 1.23, (1989): pp. 215-226.

(Continued)

*Primary Examiner* — Robert B Leung
*Assistant Examiner* — Bruce S Ashley
(74) *Attorney, Agent, or Firm* — Tope-McKay & Associates

(57) ABSTRACT

Described is a system for detecting adversarial activities. During operation, the system generates a multi-layer temporal graph tensor (MTGT) representation based on an input tag stream of activities. The MTGT representation is decomposed to identify normal activities and abnormal activities, with the abnormal activities being designated as adversarial activities. A device can then be controlled based on the designation of the adversarial activities.

16 Claims, 9 Drawing Sheets

(56) References Cited

PUBLICATIONS

Candes, E., Li, X., Ma, Y. and Wright, J., "Robust Principal Component Analysis?" Journal of the ACM, 58(3), 11 (2011), pp. 1-37.

Cun Mu, Bo Huang, John Wright and Donald Goldfarb, "Square Deal: Lower Bounds and Improved Relaxations for Tensor Recovery", Proceedings of the 31st International Conference on Machine Learning, Beijing, China, 2014. UMLR: W&CP vol. 32. Copyright 2014 by the author(s), pp. 1-9.

Zhou, T. and Tao, D., "GoDec: Randomized low-rank & sparse matrix decomposition in noisy case," Proceedings of the 28th International Conference on Machine Learning (ICML), pp. 33-40 (2011).

Margo, Daniel W., and Robin Smogor. "Using Provenance to Extract Semantic File Attributes." TaPP. 2010, pp. 1-5.

Ediger, David, et al. "Stinger: High performance data structure for streaming graphs." High Performance Extreme Computing (HPEC), 2012 IEEE Conference on. IEEE, 2012, pp. 1-5.

Palo Alto Networks, "WildFire Datasheet", 2014, pp. 1-3.

Debar, Hervé, Marc Dacier, and Andreas Wespi. "Towards a taxonomy of intrusion-detection systems." Computer Networks 31.8 (1999): pp. 805-822.

Tjhai, Gina C., et al. "Investigating the problem of IDS false alarms: An experimental study using Snort." Proceedings of the IFIP TC 11 23rd International Information Security Conference. Springer US, 2008, pp. 253-267.

Yen, Ting-Fang, et al. "Beehive: Large-scale log analysis for detecting suspicious activity in enterprise networks." Proceedings of the 29th Annual Computer Security Applications Conference. ACM, 2013, pp. 199-208.

Kang-Yu Ni and Shankar Rao. "SAR moving target imaging using sparse and low-rank decomposition." SPIE Defense + Security. International Society for Optics and Photonics, 2014, pp. 1-7.

Ni, Kang-Yu, Benvenuto, R. Bhattacharyya, R. Millin. "Feature Transformation of Neural Activity with Sparse and Low-Rank Decomposition", SPIE Medical Imaging, Biomedical Application in Molecular, Structural, and Functional Imaging, 2015, pp. 1-10.

* cited by examiner

SYSTEM AND METHOD FOR DETECTING ADVERSARIAL ACTIVITIES USING A COMPACT GRAPH REPRESENTATION

CROSS-REFERENCE TO RELATED APPLICATIONS

This application claims the benefit of and is a non-provisional patent application of U.S. Provisional Application No. 62/500,489, filed on May 2, 2017, the entirety of which is hereby incorporated by reference.

BACKGROUND OF INVENTION

(1) Field of Invention

The present invention relates to an adversarial detection system and, more specifically, to a system and method for detecting adversarial activities using a compact graph representation for complex computing environments.

(2) Description of Related Art

Computer networks and other computing environments can be subject to adversarial attack and corruption. Over the years, a variety of techniques have been devised in an attempt to detect such adversarial activities. A problem with existing techniques arises due to a need to process the high throughput tag stream of data passing through the networks. Researchers have attempted to solve this problem using variations of graph construction Many current state-of-the-art provenance graph construction techniques are text-based tag processing and do not scale well. For example, Morgo et al. created a text-based tag processing system; however, their process takes one day to process 100k nodes and 1M edges (see the List of Incorporated Literature References, Literature Reference No. 8).

A current state-of-the-art scalable, high performance graph data structure, STINGER (Spatio-Temporal Interaction Networks and Graphs Extensible Representation), enables analytics of big data with fast insertions, deletions, and updates on graphs with semantic information (see Literature Reference No. 9). The dynamic graph data structure is based on linked lists of blocks that supports fast updates. With this data structure, 3 million updates per second with 537 million edges was achieved on a Cray XMT family and Intel multicore servers. However, the STINGER process assumes graphs to be scale-free and not general enough.

Other techniques use sandboxed and cloud-based processes. While somewhat operable, sandboxed and cloud-based detection of suspicious executables/files is slow, misses threats and is ineffective for multi-stage and slow APT attacks (see Literature Reference No. 10).

Another method was devised using statistical techniques. However, statistical anomaly detection has high false alarm rates because the entire scope of the behavior of an information system may not be covered during the learning phase (see Literature Reference No. 11).

In other work, signature-based detection missed 0-day attacks and has high false alarm rates. For example, such a signature-based detection process resulted in approximately 96% false positive for SNORT using the DARPA 1998 dataset (see Literature Reference No. 12).

In yet other work, Yen at al. performed a large-scale log analysis for detecting suspicious activity in enterprise networks (see Literature Reference No. 13). Their process relied on log files, rule updates and human experts. Notably, the process described by Yen et al. failed against non-anomalous attacks.

As noted above, current methods of adversarial detection rely on manual investigation of abnormal activities which are slow, error-prone, and do not scale. Further, due to the complex computing environments in which such adversarial attacks occur, there are at least six technical challenges that need to be overcome to develop an effective system for detecting adversarial activities. Such challenges include:

1. High-throughput activities and interactions: Considering the expected high throughput and complexity of incoming data tag information, real-time ingestion is a challenge. Ingestion techniques must scale with tag stream throughput and changes in processing load. Any latency in processing will be compounded over time as the system slips further and further behind the stream.
2. Expected high rate of production of the graphs: Network analytics algorithms must be processing and memory-efficient, with low communication overhead, and have near real-time throughput to process the tag stream into a series of graphs that represent the provenance chain activity's causal dependencies.
3. Broad temporal scale of provenance chains: Tagged activities within provenance chains may occur within milliseconds or months of each other and any data representations of their causal dependencies must be immune to the fine-grained sample rate of event timing and efficiently store their temporal ordering for both real-time and historical forensic analysis.
4. Missing data: Incomplete tags cause ambiguity of provenance graphs.
5. Inaccurate data: A method is needed that is robust to tag errors.
6. Stealthy activities are sparse and disguised in massive amount of normal activities: A method is needed that is capable of globally recognizing normal activities and also able to adapt to new normal activities.

Thus, a continuing need exists for a system to detect adversarial activities that surpasses current text-based tag processing methods to build provenance graphs in a scalable way and that addresses the technical challenges posed above.

SUMMARY OF INVENTION

This disclosure provides a system for detecting adversarial activities. In some embodiments, the system comprises one or more processors and a memory, the memory being a non-transitory computer-readable medium having executable instructions encoded thereon, such that upon execution of the instructions, the one or more processors perform several operations, such as generating a multi-layer temporal graph tensor (MTGT) representation based on an input tag stream of activities; decomposing the MTGT representation to identify normal activities and abnormal activities, the abnormal activities being designated as adversarial activities; and controlling a device based on the designation of the adversarial activities.

In another aspect, the MTGT representation is generated by using an adaptive staggered temporal window module that uses a set of staggered windows to process the tag stream, such that each window processes a subset of tags from the tag stream and produces a graph tensor from the subset of tags within that window.

In yet another aspect, the input tag stream is partially ordered using a series of vector clocks.

In another aspect, the input tag stream of activities includes a plurality of provenance chains, the provenance chains being partially ordered by the series of vector clocks such that a vector clock timestamp is assigned to each activity within the provenance chains.

In yet another aspect, the vector clock timestamp assigned to each activity contains a logical clock for each of the provenance chains currently being tracked, the logical clock incrementing for each activity within a chain and updating when there is an interaction between chains.

Further, the sparse and low rank tensor (SLR-T) decomposition separates the MTGT representation to identify normal activities and abnormal activities.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
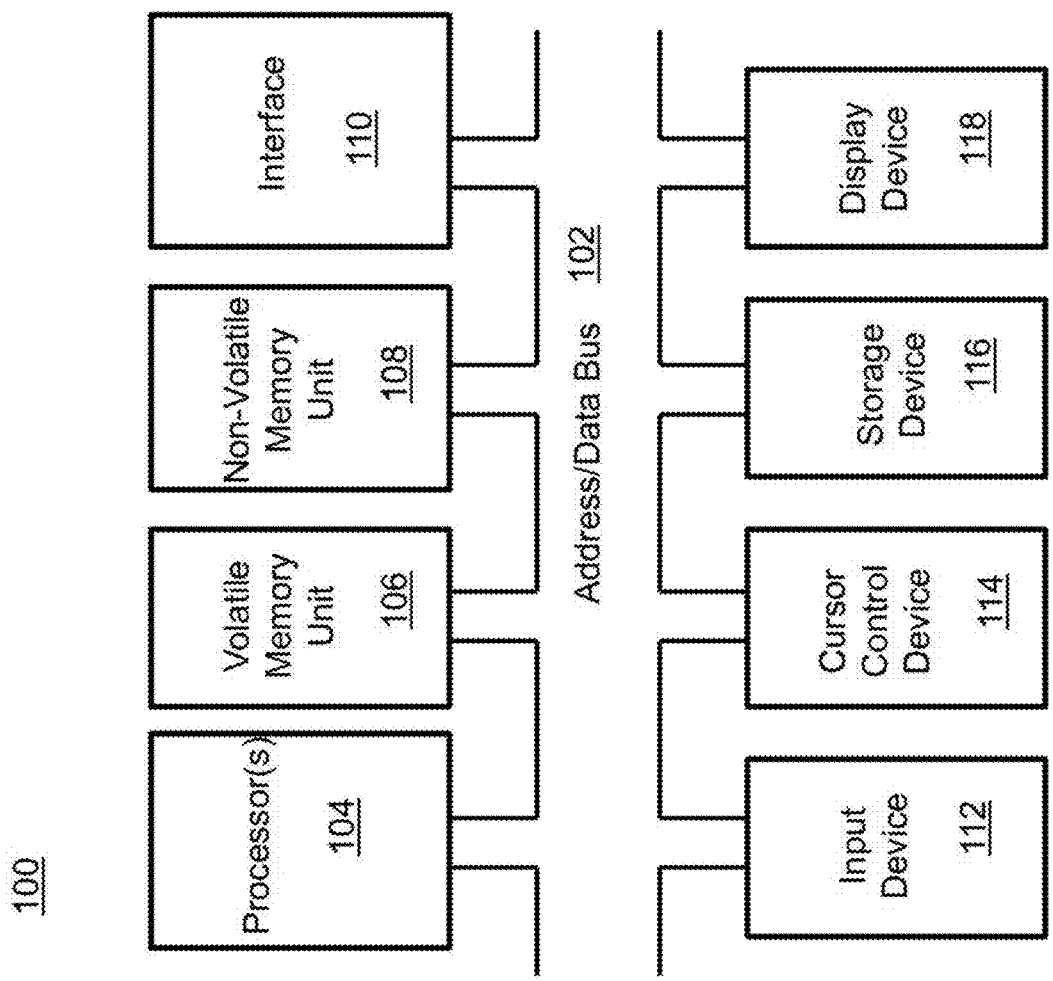
FIG. 1 is a block diagram depicting the components of a system according to various embodiments of the present invention.

The present invention relates to an adversarial detection system and, more specifically, to a system and method for detecting adversarial activities using a compact graph representation for complex computing environments. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. L. Lamport, "Time, clocks and the ordering of events in a distributed system," Commun. ACM, vol. 21, no. 7, pp. 558-565, July 1978.
2. Marrington, Andrew Daniel. "Computer profiling for forensic purposes." (2009).
3. Fidge, Colin J. "Timestamps in message-passing systems that preserve the partial ordering." Proceedings of the 11th Australian Computer Science Conference. Vol. 10. No. 1. 1988.
4. Mattern, Friedemann. "Virtual time and global states of distributed systems." Parallel and Distributed Algorithms 1.23 (1989): 215-226.

5. Candes, E., Li, X., Ma, Y. and Wright, J., "Robust Principal Component Analysis?" Journal of the ACM, 58(3), 11 (2011).
6. Cun Mu, Bo Huang, John Wright and Donald Goldfarb, "Square Deal: Lower Bounds and Improved Relaxations for Tensor Recovery", preprint, 2013.
7. Zhou, T. and Tao, D., "GoDec: Randomized low-rank & sparse matrix decomposition in noisy case," Proceedings of the 28th International Conference on Machine Learning (ICML), 33-40 (2011).
8. Margo, Daniel W., and Robin Smogor. "Using Provenance to Extract Semantic File Attributes." TaPP. 2010.
9. Ediger, David, et al. "Stinger: High performance data structure for streaming graphs." *High Performance Extreme Computing (HPEC), 2012 IEEE Conference on*. IEEE, 2012.
10. Palo Alto Networks, "WildFire Datasheet", 2014
11. Debar, Hervé, Marc Dacier, and Andreas Wespi. "Towards a taxonomy of intrusion-detection systems." *Computer Networks* 31.8 (1999): 805-822.
12. Tjhai, Gina C., et al. "Investigating the problem of IDS false alarms: An experimental study using Snort." *Proceedings of the IFIP TC* 11 *23rd International Information Security Conference*. Springer US, 2008.
13. Yen, Ting-Fang, et al. "Beehive: Large-scale log analysis for detecting suspicious activity in enterprise networks." Proceedings of the 29th Annual Computer Security Applications Conference. ACM, 2013.
14. Kang-Yu Ni and Shankar Rao. "SAR moving target imaging using sparse and low-rank decomposition." *SPIE Defense+ Security*. International Society for Optics and Photonics, 2014.
15. Ni, Kang-Yu, Benvenuto, R. Bhattacharyya, R. Millin. "Feature Transformation of Neural Activity with Sparse and Low-Rank Decomposition", SPIE Medical Imaging, Biomedical Application in Molecular, Structural, and Functional Imaging, 2015.

(2) Principal Aspects

Various embodiments of the invention include three "principal" aspects. The first is a system for detecting adversarial activities. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
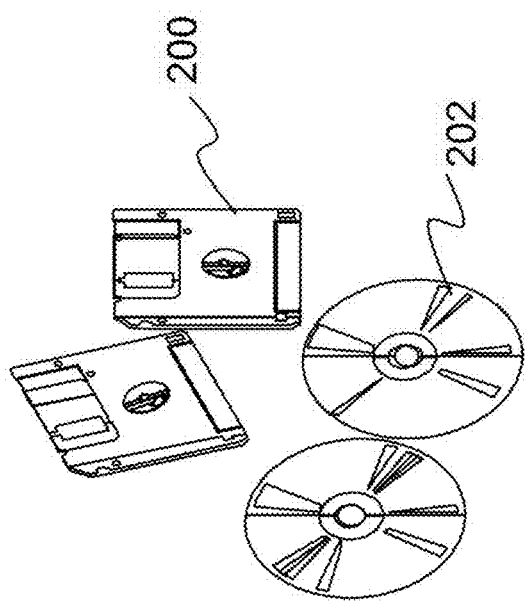
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Figure 3A:
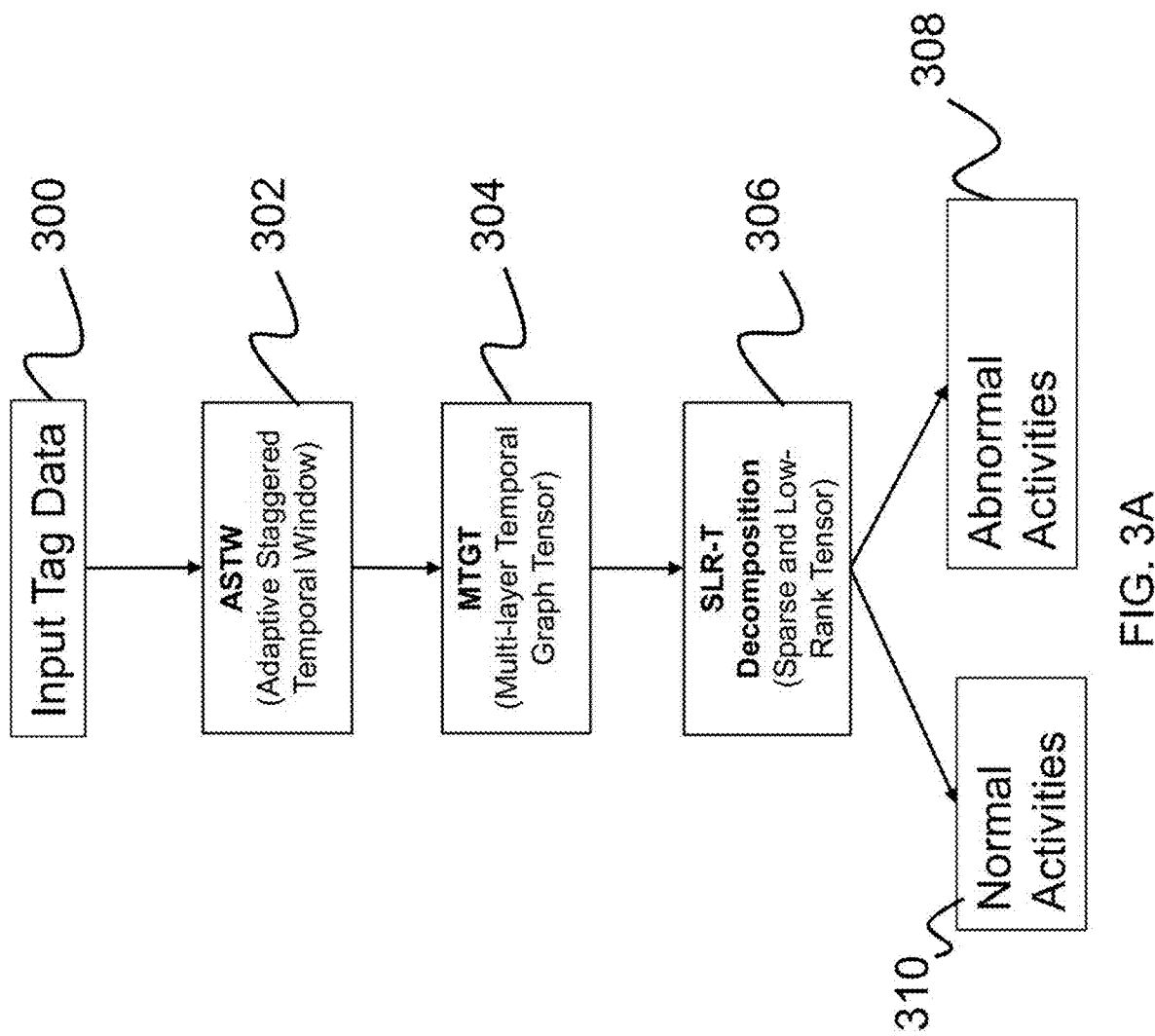
FIG. 3A is a process flow chart according to various embodiments of the present invention.

This disclosure is directed to a system and method for detecting adversarial activities using a compact graph representation (CGR) module for complex computing environments. By adversarial activities is meant attempts of persons unknown to "hack" or otherwise gain unauthorized access to one or more computers or components on a network. Due to the complex nature of the computing environments, there are a number of technical challenges to be overcome by the CGR module. Addressing such technical issues, the present disclosure provides a system that uses an efficient and scalable CGR of high-throughput interactions based on graph tensors to understand complex computing environments toward exposing advanced cyber adversaries. As shown in the flowchart depicted in FIG. 3A, the system is initiated by receiving an input tag stream 300. Using Adaptive Staggered Temporal Window (ASTW) 302, a rich and voluminous input tag stream 300 of activities is formulated into a mathematical Multilayer Temporal Graph Tensor (MTGT) 304 representation. To build provenance graphs, the system uses the ASTW 302 implementation of vector clocks to represent time as a partially ordered set among the provenance graphs, which gracefully handles interaction, splitting, and merging among the provenance chains and allows for temporal analysis across time greater than the window length. ASTW 302 provides compact representations of input fine-grained provenance graphs. A provenance graph is a directed acyclic graph constructed of tagged data to track the provenance trail of agents, processes, and data involved in the transmission of information. The nodes of the graph represent the agents (e.g., persons), processes (e.g. software stack entity), and data (e.g., memory, disk), while the directed edges of the graphs preserve causality (e.g., generated-by, used-by, contributes-to, etc.). A chain is a type of graph that is an alternating sequence of nodes and edges, starting and ending at a node, in which each edge is adjacent in the sequence to its two endpoints. A graph is more general than a chain because it does not have to have the pattern of alternating sequence of nodes and edges and can model phenomenon such as splits, merges, etc., naturally.

From the MTGT 304 representation, incomplete tag data can be inferred by low-rank tensor approximation, and different activity components can be separated using Sparse and Low Rank Tensor (SLR-T) 306 decomposition. SLR-T 306 automatically separates normal activities 310 and abnormal activities 308, allowing for the detection of the abnormal activities 308 (i.e., adversarial activities).

The ASTW 302 solves the problem of processing the high throughput tag stream 300 data by utilizing large-scale parallelization of the task to break the problem into smaller, more manageable pieces that are processed independently in near-real time. The ASTW 302 is composed of a bank of time-staggered windows, which are overlapping segments of the tag stream 300. By segmenting the stream 300 into manageable pieces, the causal dependencies within and among the windowed sections can be processed and instantiated into the MTGT data structures 304 much more quickly than methods of single stream analysis.

Both the ASTW 302 and MTGT 304 use a system of logical clocks called "vector clocks" to represent time as a unitless partially ordered set among the provenance chains and processing windows. Vector clocks are well known in the distributed systems community and are used to partially order events among concurrently running threads of execution when global time stamps are unreliable. The present system's use of vectors clocks to represent the partial ordering of provenance chain activities from the tag stream 300 allows the system to implement a memory-efficient, massively parallel and scalable approach that is perfectly compatible with the rich mathematical frameworks of multilayer tensor analysis and network sciences.

The SLR-T 306 decomposition extends SLR matrix decomposition developed in the computer vision domain and reduces the activity of interest space to abnormal activities. Global activity information is discovered with low-rank tensor approximation techniques that are extendible to tensor completions for incomplete tags. SLR-T 306 decomposes MTGT 304 into a low rank MTGT component (normal activities) and a sparse MTGT component (abnormal activities). Since the MTGT 304 grows over time, SLR-T 306 is performed on windowed portions of the MTGT 304. The tensor basis of the low rank MTGT can be used as a template for the incoming MTGT portion to filter out normal activities with very low computational complexity requiring and obtain abnormal activities. Therefore, SLR-T 306 only needs to be performed periodically (e.g., per day, per week, etc.), instead of continuously. The sparse MTGT represents a subgraph of the full provenance graph that is associated with the abnormal activities.

The parallelized processing bank of ASTW 302 ingests the tag stream 300 and constructs the tensor layers within each window. This will allow the system to easily increase or decrease the number of processing windows in the bank as the tag stream 300 throughput changes and accommodate the change in order to meet real-time processing requirements.

Regarding the MTGT 304 representation for graphs, experiments demonstrated <1 seconds to generate one thousand 1000×1000 graph tensors with random entries on a typical work machine. Further, because SLR-T 306 decomposition only needs to be calculated periodically to learn the global activity pattern basis, new inputs can be processed in real-time via projection onto the learned basis. This allows the system to reduce the abnormal activity search space without missing advanced persistent threat (APT) (i.e., adversarial activities). By initially setting the sparsity percentage (k) to be 10% of the total number of activities, the SLR-T decomposition can be used to separate the global activities (low rank MTGT) from the abnormal activities (sparse MTGT).

The CGR framework of the present disclosure can be applied to a number of applications in which it is desirable to detect stealthy and sparse adversarial activities. For example, the system described herein can be implemented with network cybersecurity services and products. Thus, the CFR framework can be incorporated into a variety of operations to protect against low-profile and infrequent but continued adversarial threats. Further details are provided below.

(4) Specific Details of Various Embodiments

Figure 3B:
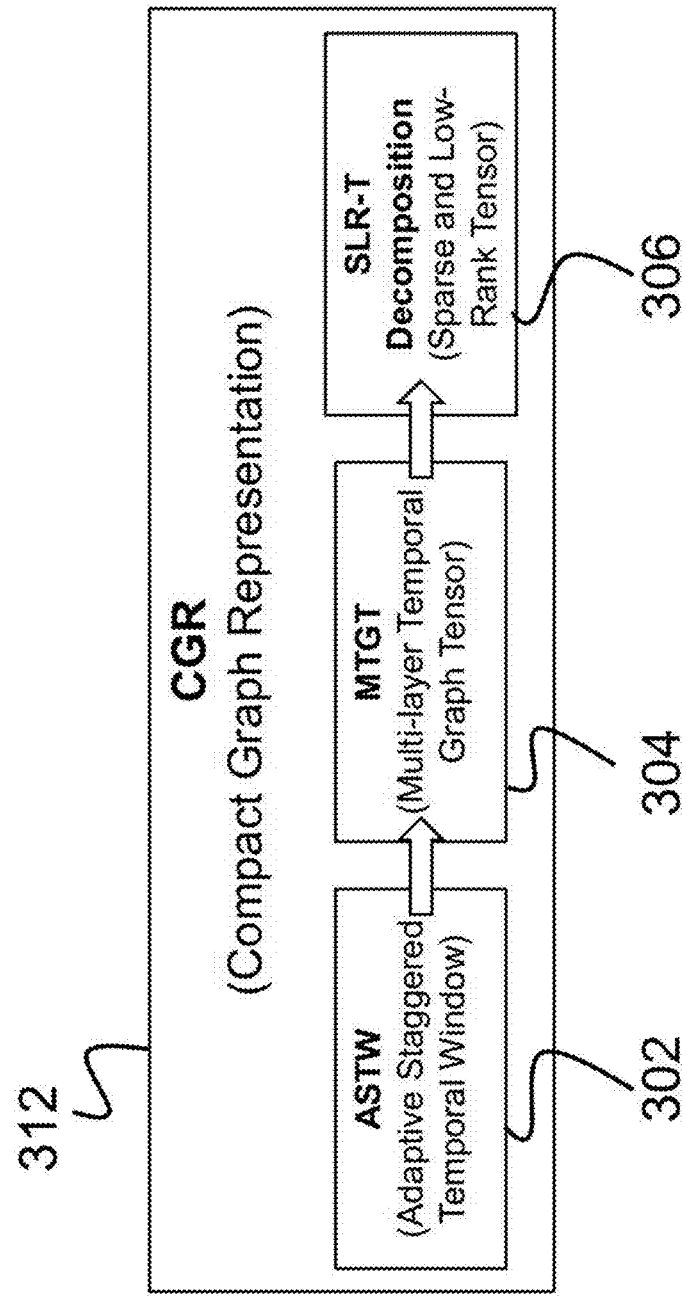
FIG. 3B is an illustration of a compact graph representation (CGR) module and corresponding components.

As shown in FIG. 3B, this disclosure provides a Compact Graph Representation (CGR) module 312 to process the high throughput tag stream of provenance chain activities with the goals to construct provenance graphs in real-time and provide a framework for efficient and enhanced anomaly detection and forensic analysis. As noted above, the CGR module 312 aims to process voluminous tag propagation data and construct provenance graphs with a Multilayer Temporal Graph Tensor (MTGT) 304 representation in real time. The purpose of the MTGT 304 data structure is to provide a compact tensor representation of causal activity dependencies within and among provenance chains across multiple time scales. The MTGT 304 is an abstraction of provenance graphs that incorporates all tag data and grows with time. The tensor is created in near real time by utilizing a parallel processing bank of Adaptive Staggered Temporal Windows (ASTW) 302 to ingest the tag stream into the system (and CGR module 312) and construct the tensor layers from the provenance chain activities within each window. Temporal scales are collapsed into a logical partial ordering representation that allows for the ordering of events across provenance chains and the ASTW 302. From the MTGT 304 representation, incomplete tag data can be inferred by low-rank tensor approximation, and different activity components can be separated using Sparse and Low Rank Tensor (SLR-T) 306 decomposition. The SLR-T 306 module automatically separates normal activities 310 and abnormal activities 308.

Provided below is a detailed description of the CGR module 312 and how it is constructed, followed by details of the various sub-modules referenced above which perform the following: ingest the high throughput tag stream of provenance chains, provide a partial ordering of activities, construct a multilayer tensor representation of causal dependencies across any time scale and flag abnormal activities.

(4.1) Adaptive Staggered Temporal Window (ASTW)

Figure 4:
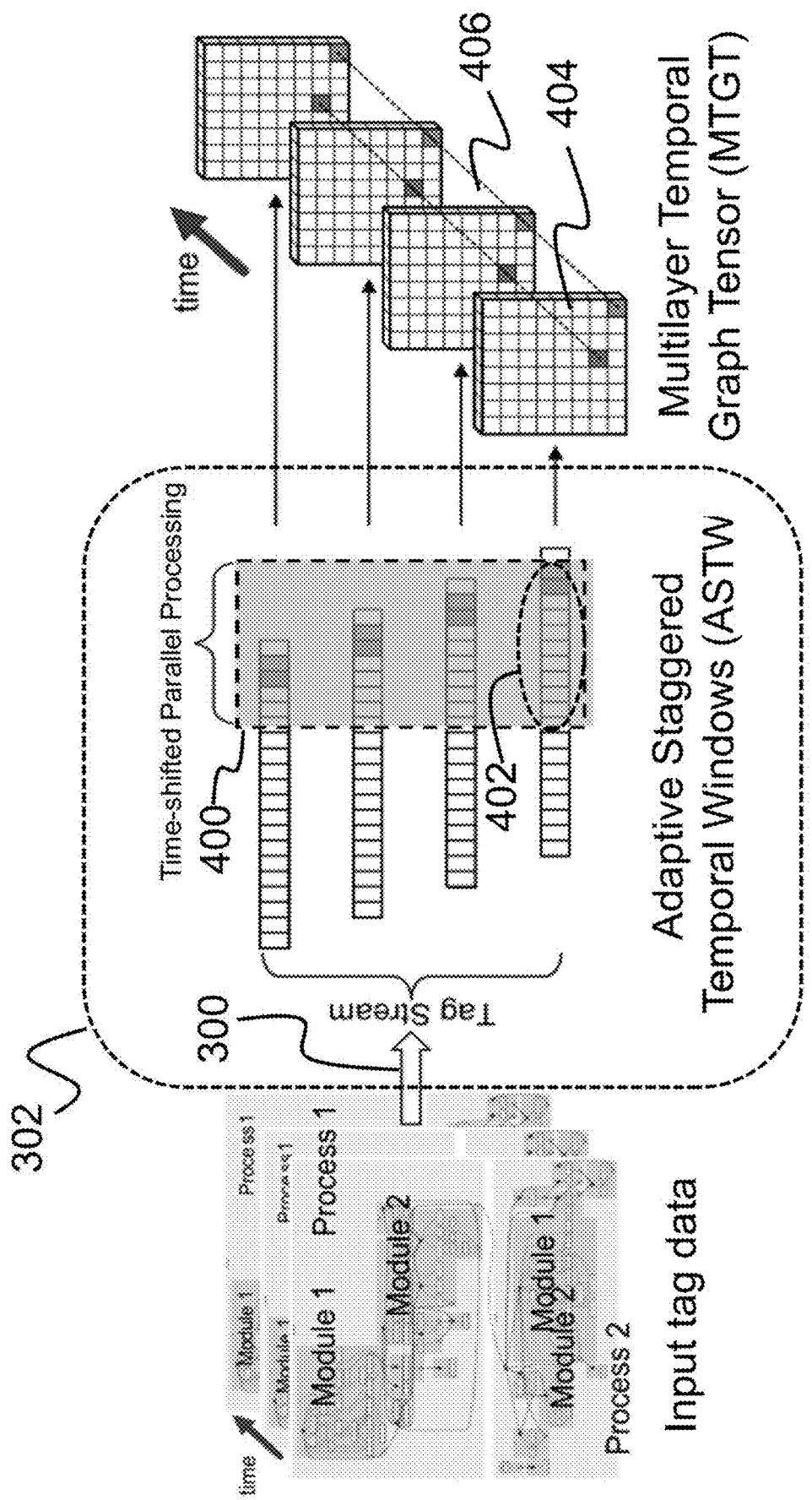
FIG. 4 is an illustration of process flow within the CGR module, depicting the CGR module as employing a parallel bank of processing windows to ingest the high throughput tag stream into a compact Multilayer Temporal Graph Tensor (MTGT) in real time.

As noted above, the CGR module 312 includes an ASTW 302 module. For further understanding, the ASTW 302 module is depicted in FIG. 4. As shown, the ASTW 302 uses a set of staggered windows 400 to process the high throughput tag stream 300 in real-time by using a massively parallel approach. Each window processes a small subset of tags from the stream 300 and produces a graph tensor from the tags within that window. For example, processing a first subset of tags 402 produces a first graph tensor 404 from the tags within that window. However, because processing N tags will most likely take longer than ingesting the next N tags, the tag processing is done offline while additional windows in the system process the next tags in the stream. Therefore, an approximation to real-time processing can be achieved with a bank of windows large enough to ingest the tag stream 300. As the tag stream 300 throughput changes, this staggered window approach will allow us to easily increase or decrease the number of processing windows in the bank to accommodate the change in order to meet real-time processing requirements.

Provenance chain lifetimes will be greater than the temporal extent of each processing window, so it is unlikely any window will contain all causal dependencies needed to find slow, stealthy attacks. Therefore, each window in the bank will overlap with adjacent windows in the system. Edges between the common nodes in adjacent windows will provide linkages 406 between the tensor layers that will allow for temporal global activity analysis using this piece-wise processing approach.

A fundamental problem in analyzing provenance chains across multiple processes, computers, or networks is determining the order in which activities in different chains occurred. A naïve solution is to use the timestamp representing the local system time on an activity tag within a provenance chain. However, this assumes that each system and process can access an accurate global clock to act as a central time-stamp authority for a total ordering of activities among the provenance chains. Use of a central time-stamp is difficult, if not impossible, to ensure consistent causal dependencies across a system because of variations in local system clocks, network latency, clock skew, etc., which make the timestamps unreliable and the concurrent nature of provenance chain activities problematic (see, for example, Literature Reference Nos. 2 and 4).

A solution to this problem comes from the distributed systems community, which has to deal with race conditions and concurrency issues across systems without a reliable central time-stamp authority (see, for example, Literature Reference Nos. 1, 3, and 4 for a discussion of time stamps and distributed systems). Such prior art uses a system of logical clocks whereby activities are given a virtual timestamp relative to other activities within the same computer, processes, etc. in order to implement the relation "→" ("happened before") (see Literature Reference No. 1) in which $\alpha \to b$ if and only if activity a occurs before b such that b has a causal dependency on $\alpha$. If $\alpha \nrightarrow b$ and $b \nrightarrow \alpha$ then the two events may have occurred concurrently (see Literature Reference Nos. 1 and 3).

For the system of the present disclosure, each of the ASTWs has a unique integer identifier as part of the timestamp. The first processing window has a timestamp of 1, the next window is 2, etc. Since the processing windows overlap each other on the tag stream, windows 1 and 2 will share a subset of provenance chain activities. Within each provenance chain and between windows, a total ordering of activities can easily be inferred. However, because the logical clocks of each provenance chain and processing window are incremented independently of each other, additional temporal information regarding the state of each provenance chain must be maintained in order to infer activity orderings among the different provenance chains.

Figure 5:
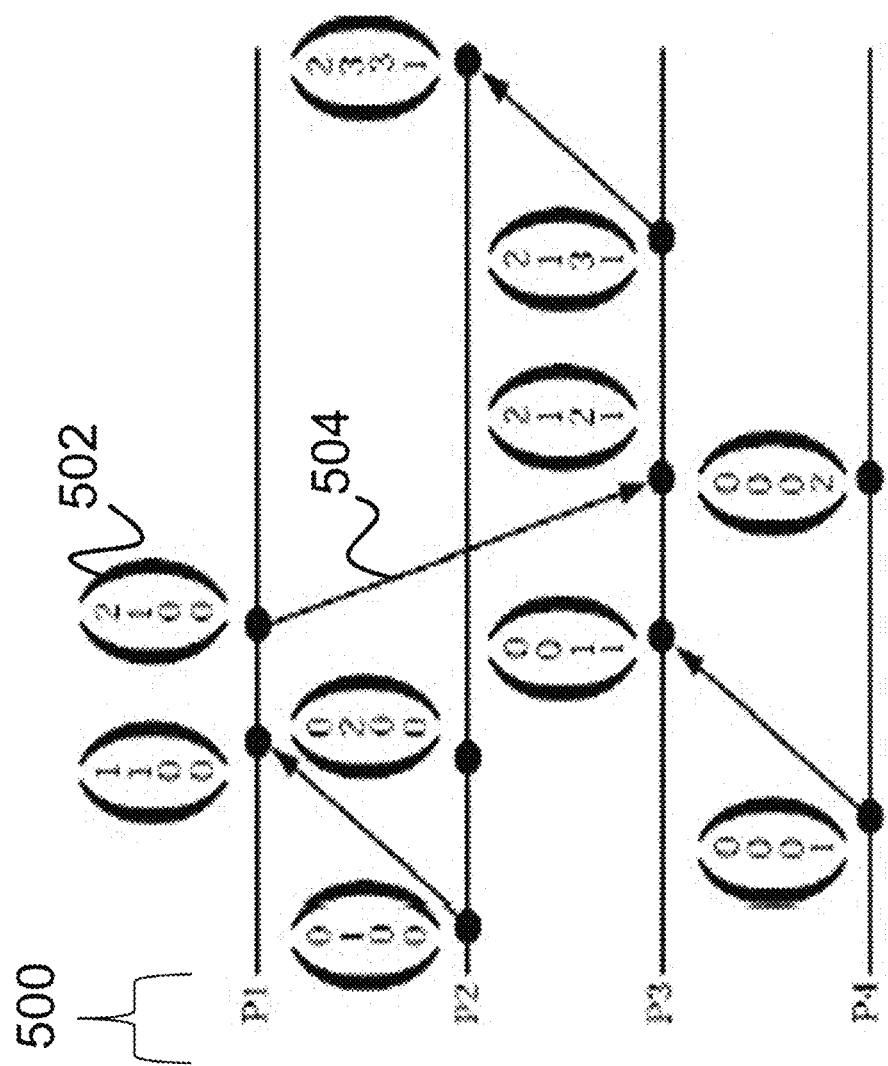
FIG. 5 is an illustration of vector clocks as providing a partial ordering of tagged activities through a system of logical counters across all provenance chains and time-shifted windows processing the input stream.

To address these issues, the present system implements a system of vector clocks, as illustrated in FIG. 5, to maintain an approximation to the global temporal state of the system at each activity. In the figure, four provenance chains (P1-P4) 500 are shown with time stamped activities 502 and interactions (arrows) 504 between chains to model splits, merges, etc. that may occur between chains 500. The vector clock timestamp assigned to each activity 502 contains a logical clock for each of the provenance chains (rows) 500 currently being tracked. The logical clock in P1 increments for each of the two activities 502 within the chain 500 and updates its estimates for the other chains 500 whenever there is an interaction 504 between them. These interactions 504 allow the provenance chains 500 to share their local vector clock information with each other. Therefore, each vector clock is aware of a partial ordering of the causal dependencies between itself and the other provenance chains 500. This partially ordered system of vectors forms a lattice structure of the causal dependencies and is a natural representation of time in a system with concurrent provenance chains (see Literature Reference No. 4 for a discussion of virtual time and global states of distributed systems). The benefits of the ASTW vector clock representation include: (1) partial ordering of activities between provenance chains and temporal windows are maintained, (2) overlapping windows allow for temporal analysis across time greater than window length, and (3) enable time-series motif analysis of vector clocks.

(4.2) Multilayer Temporal Graph Tensor (MTGT)

Figure 6:
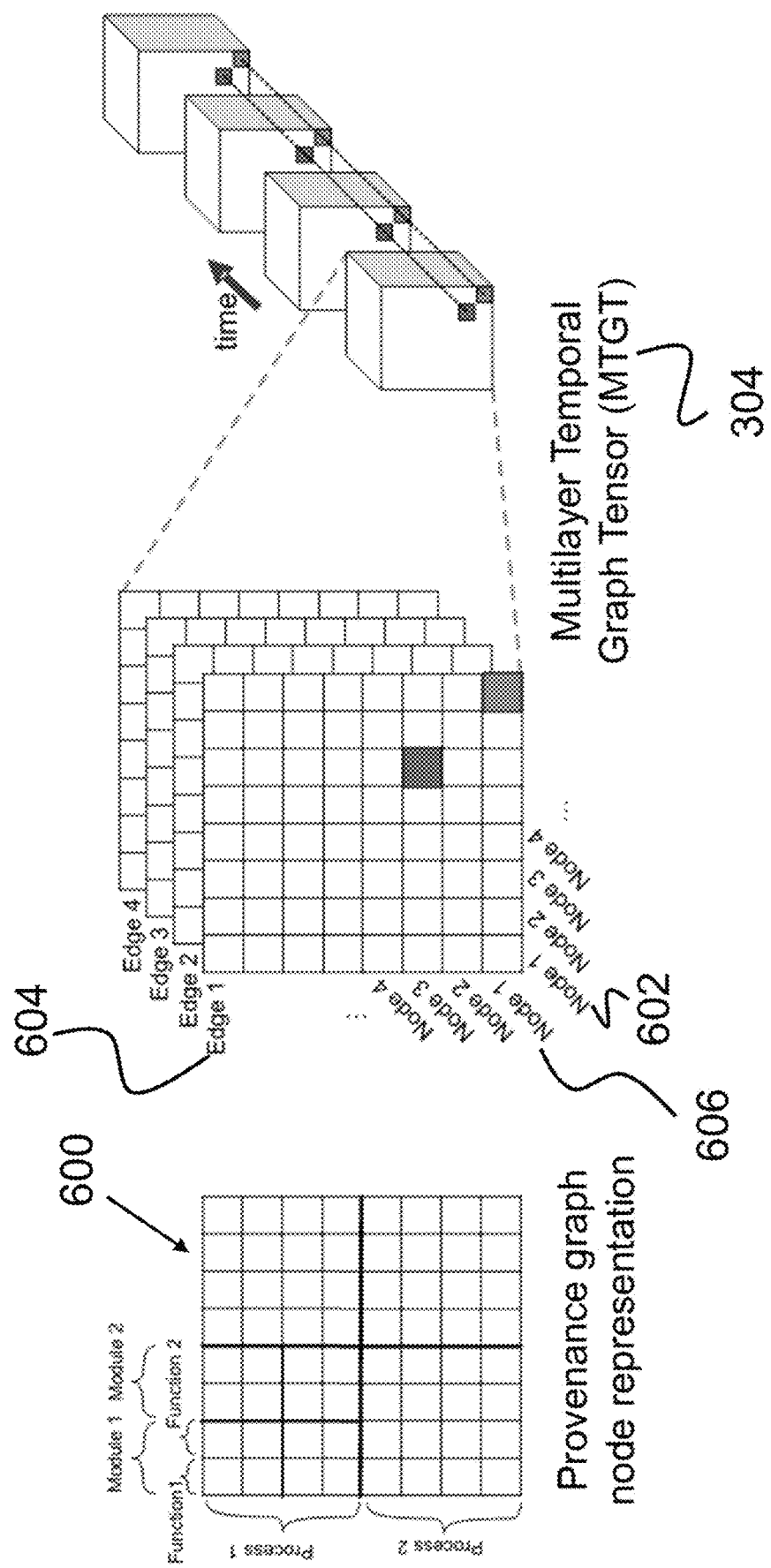
FIG. 6 is an illustration of depicting the Multilayer Temporal Graph Tensor (MTGT) module as defining multiple node and edge types in order to capture complex interactions of the provenance chain activities, their causal dependencies, and their temporal evolution.

As shown in FIG. 6, the purpose of the MTGT 304 data structure is to construct provenance graphs and provide a compact tensor representation of fine-grained causal activity dependencies within and among provenance chains across multiple time scales. The entries in the MTGT 304 represent the connectivity of the provenance graph and the rich tag data features. Element 600 shows the node label of the provenance graph, such as follows:
Node 1: process 1, module 1, function 1
Node 2: process 1, module 1, function 2
Node 3: process 1, module 2, function 1
Element 602 is the tensor representation of the provenance graph. For example, if entry (shaded grey) of {Node 3, Node 6, Edge 1} is nonzero, that means there is an edge going from Node 3 to Node 6 at time 1.

The MTGT 304 data structure allows not only efficient and faithful representation of structural properties of multidimensional data, but also powerful mathematical tools to operate on voluminous input data, in particular when stealthy activities are sparse and disguised in millions of normal activities. The tensor is created in near real time by utilizing a parallel processing bank of ASTW (described above) to ingest the tag stream into the system and construct the tensor layers from the provenance chain activities within each window.

The causal activity dependencies are stored in a tensor, which is a multidimensional array. For example, denote an $N^{th}$-order tensor of size $I_1 \times I_2 \times \ldots \times I_N$ is by $\mathcal{T} \in \mathbb{R}^{I_1 \times I_2 \times \cdots \times I_N}$, with numerical values $\alpha_{i_1 i_2 \ldots i_N} = \mathcal{T}(i_1, i_2, \ldots i_N)$. As noted above, an example of an MTGT 304 for provenance graphs 600 is illustrated in FIG. 6.

The fundamental data structure for provenance is a directed acyclic graph (DAG), where the nodes are process invocations and information about data:
1. Invocations: Activities that manipulate data. Example: (Process#, Module#, Function#);
2. Data (pointer): Collections of symbols that represent contents of data. Example: Data#.

Further, there are four types of edges in a provenance graph, where the type depends on the types of the nodes that the edge connects:
1. Generated: Connects an invocation to the data it outputs;
2. Input to: Connects data to an invocation that it feeds;
3. Contributed: Connects a data item to another data item, indicating that the contents of the former contributed to the latter;
4. Triggered: Connects an invocation to another invocation, indicating that the former caused the invocation of the latter without an intervening data input.

In general, the MTGT tensor dimensions are (node 602, node 606, edge 604, feature x, feature y, feature z, . . . , vector clock), where the first three dimensions together translate into a DAG. The other dimensions store the descriptive features, such as memory access frequency, location, and frequency and type of CPU and I/O related system calls. By placing the vector clock within the tensor and not making it a node property, tensor decomposition methods and other mathematical tools can be leveraged to analyze temporal patterns within and among the provenance chains.

To handle incomplete input tag data, existing tensor recovery techniques can be used. Tensor recovery techniques typically attempt to estimate the incomplete tensor with low-rank tensors, since the underlying data structure is often intrinsically low dimensional. The global activity patterns are captured by approximating the incomplete MTGT with low-rank tensors. Although not limited thereto, described below are two tensor decomposition methods that can be employed. In canonical polyadic (CP) tensor decomposition, a tensor $\tau$ is written as a sum of R rank-1 tensors, each of which can be written as the outer product of N factor vectors $$a_r^{(n)} : \mathcal{T} = \sum_{r=1}^{R} a_r^{(1)} \otimes a_r^{(2)} \otimes \ldots \otimes a_r^{(N)}$$

The Tucker decomposition of a tensor $\tau$ is given as a multilinear transformation of a small core tensor $C \in \mathbb{R}^{R_1 \times \cdots \times R_N}$ by factor matrices $A^{(n)} \in \mathbb{R}^{I_n \times R_n}$, $\mathcal{T} = C \cdot_1 A^{(1)} \cdot_2 A^{(2)} \ldots \cdot_N A^{(N)}$. In the case of a low-rank CP approximation, the incomplete tensor recovery problem is framed as:

$$\text{rank}_{CP}(\mathcal{T}) = \min\left\{r \mid \mathcal{T} = \sum_{i=1}^{r} d_1^{(i)} \circ d_2^{(i)} \circ \ldots \circ d_K^{(i)}\right\}.$$

(4.3) Sparse and Low Rank Tensor (SLR-T) Decomposition

Figure 7:
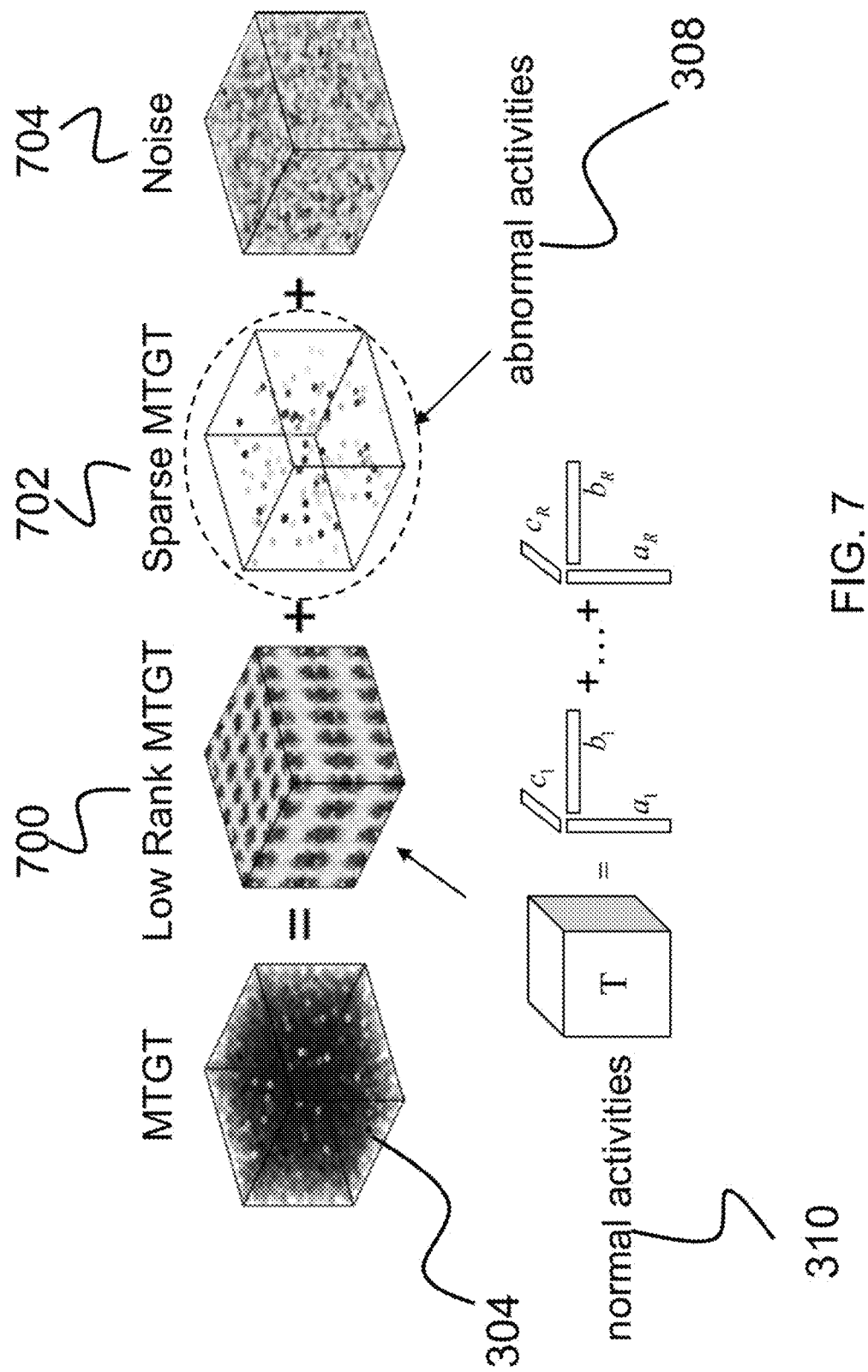
FIG. 7 is an illustration depicting a Sparse and Low Rank Tensor (SLR-T) Decomposition module as further simplifying the MTGT representation and separating the abnormal activities from normal activity patterns.

The application of SLR-T decomposition to MTGT aims to dramatically reduce the abnormal activity search space. As shown in FIG. 7, the idea is to simultaneously extract normal activity 310 patterns and separate abnormal activities 308 from the MTGT 304. The global patterns are captured by low-rank tensor approximation such as using canonical polyadic tensor decomposition or Tucker decomposition. Since MTGT 304 grows over time, SLR-T is performed on windowed portions of the MTGT, subsets of the large MTGT 304. The tensor basis of the low rank MTGT 700 is used to process the incoming MTGT 304 portion to identify abnormal activities 308, which are orthogonal to the normal activity 310 tensor basis and can be performed with low complexity. Therefore, SLR-T needs to only be performed periodically (e.g., per day, per week, etc.), instead of continuously. The sparse MTGT component 702 represents a subgraph of the full provenance graph that is associated with abnormal activities 308 (i.e., adversarial activities).

The process described herein is extended from sparse and low-rank (SLR) matrix decomposition. SLR is a set of provably optimal and efficient mathematical techniques for identifying and decomposing the low-variation structure from high-dimensional raw data (see Literature Reference No. 5). It is also known as Robust principal component analysis (PCA) because it is designed to handle grossly corrupted data, rather than assuming the data noise is independently and identically distributed Gaussian.

Suppose there is a stationary camera that is viewing a scene for the task of intruder or foreground detection. If there are many raw image frames obtained over the course of a day, each frame can be stacked as a column vector of the data matrix X, which can be decomposed to X=L+S, where L is the low-rank matrix that represents the background scene and S is the sparse matrix that represents the sparse foreground. The low-rank matrix L is extremely low-rank relative to the image size, the length of the columns in X. It has been shown that the low-rank and sparse components of the data matrix X can be exactly decomposed by the following convex optimization, Principal Component Pursuit (PCP) [5]:

$$\min_{L,S} \|L\|_* + \lambda\|S\|_1 \text{ subject to } X = L + S,$$

where the nuclear norm $\|L\|_*$ takes the sum of the singular values of L and the $\ell$ 1-norm $\|S\|_1$ is the absolute sum of the entries of S. The minimum L provides a background template for stationary camera. The minimum S contains the detected foreground.

Using a similar convex relaxation for low-rank tensor approximation with the sum of the nuclear norms of the unfoldings of the tensor, however, can be substantially suboptimal. Efficient algorithms for tensor decomposition are not straightforward due to the high order structure. A recent development of a convex relaxation method (see Literature Reference No. 6) bridges the gap between non-convex models that is in general NP-hard and the conventional sum of nuclear norm models. It unfolds the tensor into a more balanced matrix while preserving its low-rank property, leading to a square-norm model. However, this low-rank tensor model does not include a sparse error tensor term.

The system of this disclosure extends the model to include a sparse component that captures local activities that are not exhibited globally: $\mathcal{X} = \mathcal{L} + \mathcal{S}$. Specifically, the SLR-T decomposition extends the fast SLR matrix decomposition algorithm as described in Literature Reference No. 7. During operation, the system decomposes a tensor $\mathcal{X}$ into three tensor components: low-rank $\mathcal{L}$ 700, sparse $\mathcal{S}$ 702, and Gaussian noise $\mathcal{G}$ 704. This is expressed in the following: $\mathcal{X} = \mathcal{L} + \mathcal{S} + \mathcal{G}$, subject to $\text{rank}(\mathcal{L}) \leq R$, $\|\mathcal{S}\|_0 \leq k \times n$, where R is a small integer, $\|\cdot\|_0$ is the $\ell_0$-norm that is the number of nonzero entries, k is the sparsity percentage, and n is the size of the tensor. This problem can be framed by the following optimization problem:

$$\min_{L,S} \|\mathcal{X} - \mathcal{L} - \mathcal{S}\|_F^2,$$

subject to $\text{rank}(\mathcal{L}) \leq R$, $\|\mathcal{S}\|_0 \leq k \times n$, where $\|\cdot\|_F$ is the Frobenius norm, the square root of the sum of squares. This optimization problem is solved by alternating the following subproblems until convergence:

$$\begin{cases} \mathcal{L}_t = \underset{L}{\text{argmin}}\|\mathcal{X} - \mathcal{L} - \mathcal{S}_{t-1}\|_F^2, & \text{subject to rank }(\mathcal{L}) \leq R, \\ \mathcal{S}_t = \underset{S}{\text{argmin}}\|\mathcal{X} - \mathcal{L}_t - \mathcal{S}\|_F^2, & \text{subject to } \|\mathcal{S}\|_0 \leq k \times n \end{cases}.$$

The first subproblem, with the sparse tensor $\mathcal{S}$ fixed, is the low-rank tensor approximation problem, which uses the square-norm model instead of using the nuclear norm to reduce computational complexity. The second subproblem can be solved by hard-thresholding.

Notably, sparse S provides the abnormal activities 308 (e.g., adversarial activities) that can be provided to an operator or other interested part. Specifically, the sparse entries in S indicate which pairs of {process, module, function} at which time are abnormal. For example, if entry of {Node 3, Node 6, Edge 1} is nonzero in S, then it indicates that Node 3 {process x, module y, function z} to Node 6 {process a, module b, function c} at time 1 is an abnormal activity

(4.4) Control of a Device.

Figure 8:
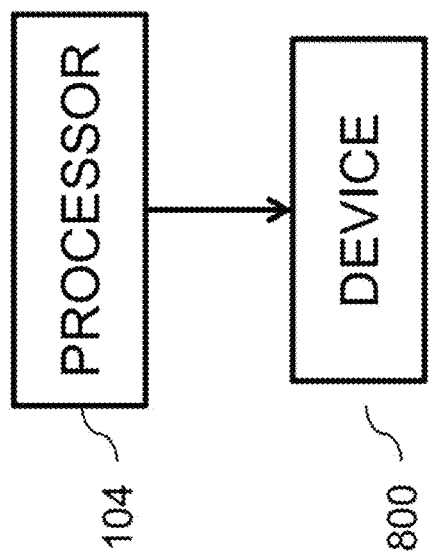
FIG. 8 is a block diagram depicting control of a device according to various embodiments.

As shown in FIG. 8, a processor 104 may be used to control a device 900 (e.g., a computer or computer network, a mobile device display, a virtual reality display, an augmented reality display, a computer monitor, a motor, a machine, a drone, a camera, etc.) based on detecting the adversarial activities. The control of the device 800 may be used to transform the detection into a notification that is transmitted as an alert (e.g., e-mail, text, display) to an interested party. In other embodiments, the device 800 may be a computer, router, or other hardware in a computer network and, based on detecting adversarial activities, the particular hardware component (e.g., computer, router, mobile phone, etc.) detected as participating in adversarial activities is isolated from the network. For example, all authorization codes or credentials for such a hardware component (e.g., node or module) can be terminated to prevent the hardware component from transmitting and/or receiving any further data within the network. As yet another example, if a particular autonomous devices (e.g., car, drone, etc.) is determined to be participating in adversarial activities, instructions can be initiated by the device or otherwise transmitted to the device to cause the device to perform a physical action. Non-limiting examples of such physical actions include shutting down (turning off), initiating a self-destruct sequence, causing actuators (e.g., motors, steering components, drive components, etc.) to initiate the relevant action to return the autonomous device to a home base or initiate a safe-mode, etc.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for detecting adversarial activities, the system comprising:
   one or more processors and a memory, the memory being a non-transitory computer-readable medium having executable instructions encoded thereon, such that upon execution of the instructions, the one or more processors perform operations of:
      generating a multi-layer temporal graph tensor (MTGT) representation based on an input tag stream of activities, wherein the MTGT representation is generated by using an adaptive staggered temporal window module that uses a set of staggered windows with tag streams that are shifted in time and processed in parallel, such that each window processes a subset of tags from the tag stream and produces a graph tensor from the subset of tags within that window
      decomposing the MTGT representation using sparse and low rank tensor (SLR-T) decomposition to identify a low-rank MTGT component and a sparse MTGT component, the low-rank MTGT component being normal activities and the sparse MTGT component being abnormal activities, such that the abnormal activities are designated as adversarial activities: and
      controlling a device based on the designation of the adversarial activities.

2. The system as set forth in claim 1, wherein the input tag stream is partially ordered using a series of vector clocks.

3. The system as set forth in claim 2, wherein the input tag stream of activities includes a plurality of provenance chains, the provenance chains being partially ordered by the series of vector docks such that a vector clock timestamp is assigned to each activity within the provenance chains.

4. The system as set forth in claim 3, wherein the vector clock timestamp assigned to each activity contains a logical dock for each of the provenance chains currently being tracked, the logical clock incrementing for each activity within a chain and updating when there is an interaction between chains.

5. The system as set forth in claim 1, wherein the input tag stream of activities includes a plurality of provenance chains, the provenance chains being partially ordered by a series of vector clocks such that a vector clock timestamp is assigned to each activity within the provenance chains.

6. The system as set forth in claim 5, wherein the vector clock timestamp assigned to each activity contains a logical clock for each of the provenance chains currently being tracked, the logical clock incrementing for each activity within a chain and updating when there is an interaction between chains.

7. A computer program product for detecting adversarial activities, the computer program product comprising:
   a non-transitory computer-readable medium having executable instructions encoded thereon, such that upon execution of the instructions by one or more processors, the one or more processors perform operations of:
      generating a multi-layer temporal graph tensor (MTGT) representation based on an input tag stream of activities, wherein the MTGT representation is generated by using an adaptive staggered temporal window module that uses a set of staggered windows with tag streams that are shifted in time and processed in parallel, such, that each window processes a subset of tags from the tag stream and produces a graph tensor from the subset of tags within that window;
      decomposing the MTGT representation using sparse and low rank tensor (SLR-T) decomposition to identify a low-rank MTGT component and a sparse MTGT component, the low-rank MTGT component being normal activities and the sparse MTGT component being abnormal activities, such that the abnormal activities are designated as adversarial activities; and
      controlling a device based on the designation of the adversarial activities.

8. The computer program product as set forth in claim 7, wherein the input tag stream is partially ordered us ng a series of vector clocks.

9. The computer program product as set forth in claim 8, wherein the input tag stream of activities includes a plurality of provenance chains, the provenance chains being partially ordered by the series of vector clocks such that a vector clock timestanip is assigned to each activity within the provenance chains.

10. The computer program product as set forth in claim 9, wherein the vector clock timestamp assigned to each activity contains a logical clock for each of the provenance chains currently being tracked, the logical clock incrementing for each activity within a chain and updating when there is an interaction between chains.

11. The computer program product as set forth in claim 7, wherein the input tag stream of activities includes a plurality of provenance chains, the provenance chains being partially ordered by a series of vector clocks such that a vector clock timestamp is assigned to each activity within the provenance chains.

12. The computer program product as set forth in claim 11, wherein the vector clock timestamp assigned to each activity contains a logical clock for each of the provenance chains currently being tracked, the logical clock incrementing, for each activity within a chain and updating when there is an interaction between chains.

13. A method for detecting adversarial activities, the method comprising an act of:

causing one or more processers to execute instructions encoded on a non-transitory computer-readable medium, such that upon execution, the one or more processors perform operations of:

generating a multi-layer temporal graph tensor (MTGT) representation based on an input tag stream of activities, wherein the MTGT representation is generated by using an adaptive staggered temporal window module that uses a set of staggered windows with tag streams that are shifted in time and processed in parallel, such that each window processes a subset of tags from the tag stream and produces a graph tensor from the subset of tags within that window;

decomposing the MTGT representation using sparse and low rank tensor (SLR-T) decomposition to identify a low-rank MTGT component and a sparse MTGT component, the low-rank MTGT component being normal activities and the sparse MTGT component being abnormal activities, such that the abnormal activities are designated as adversarial activities; and controlling a device based on the designation of the adversarial activities.

14. The method as set forth in claim 13, wherein the input tag stream is partially ordered using a series of vector clocks.

15. The method as set forth in claim 13, wherein the input tag stream of activities includes a plurality of provenance chains, the provenance chains being partially ordered by a series of vector clocks such that a vector clock timestamp is assigned to each activity within the provenance chains.

16. The method as set forth in claim 15, wherein the vector clock timestamp assigned to each activity contains a logical clock for each of the provenance chains currently being tracked, the logical clock incrementing for each activity within a chain and updating when there is an interaction between chains.

* * * * *